(12) United States Patent  (10) Patent No.: US 7,939,960 B2
Kim  (45) Date of Patent: May 10, 2011

(54) AERIAL WIND POWER GENERATING SYSTEM USING FLOATING BODY

(76) Inventor: Dae-Bong Kim, Anyang-si (KR)

( * ) Notice: Subject to any disclaimer, the term of this patent is extended or adjusted under 35 U.S.C. 154(b) by 0 days.

(21) Appl. No.: 12/598,915

(22) PCT Filed: Jul. 11, 2008

(86) PCT No.: PCT/KR2008/004097
§ 371 (c)(1),
(2), (4) Date: Nov. 4, 2009

(87) PCT Pub. No.: WO2009/131278
PCT Pub. Date: Oct. 29, 2009

(65) Prior Publication Data
US 2010/0133840 A1 Jun. 3, 2010

(30) Foreign Application Priority Data

Apr. 21, 2008 (KR) ........................ 10-2008-0036508
Jun. 13, 2008 (KR) ........................ 10-2008-0055657

(51) Int. Cl.
*F03D 9/00* (2006.01)
(52) U.S. Cl. ................................. 290/55; 290/44; 417/7
(58) Field of Classification Search ............... 290/43, 290/44, 54, 55; 417/7; 416/248
See application file for complete search history.

(56) References Cited

U.S. PATENT DOCUMENTS 4,073,516 A * 2/1978 Kling .............................. 290/55
(Continued)

FOREIGN PATENT DOCUMENTS

EP        00391601       10/1990
(Continued)

OTHER PUBLICATIONS

International Search Report dated Jan. 9, 2009 issued in PCT/KR2008/004097.

(Continued)

*Primary Examiner* — Nicholas Ponomarenko
(74) *Attorney, Agent, or Firm* — Holme Roberts & Owen LLP (57) ABSTRACT

The present invention provides an aerial wind power generating system which has an improved structure such that despite light wind, satisfactory wind power generation can be ensured, and such that it is easy to install and remove the system, thus being effectively adapted to a temporary and portable wind power generating system. The system of the present invention includes a floating body (20), which is connected to support wires coupled to a wire rotating unit, a wind passage (30), which is formed through the floating body, so that wind passes through the wind passage in the horizontal direction, and a wind power generating unit (40), which has turbine blade assemblies and generators (48). The turbine blade assemblies are installed in the wind passage and are thus rotated by wind passing through the wind passage. The generators generate electric energy using rotating force transmitted from the turbine blade assemblies.

2 Claims, 5 Drawing Sheets

U.S. PATENT DOCUMENTS

| | | | | |
|---|---|---|---|---|
| 4,166,596 | A | * | 9/1979 | Mouton et al. .................. 244/30 |
| 4,350,896 | A | * | 9/1982 | Benoit ............................ 290/55 |
| 4,450,364 | A | * | 5/1984 | Benoit ............................ 290/55 |
| 6,315,242 | B1 | * | 11/2001 | Eichstedt et al. ............... 244/30 |
| 7,129,596 | B2 | * | 10/2006 | Macedo .......................... 290/55 |
| 7,264,202 | B2 | * | 9/2007 | Sullivan ......................... 244/96 |
| 7,582,981 | B1 | * | 9/2009 | Meller ............................ 290/44 |
| 7,602,077 | B2 | * | 10/2009 | Ferguson ........................ 290/55 |
| 7,723,861 | B2 | * | 5/2010 | Meller ............................ 290/55 |
| 7,775,761 | B2 | * | 8/2010 | Ferguson ........................ 415/7 |
| 2008/0048453 | A1 | | 2/2008 | Amick |

FOREIGN PATENT DOCUMENTS

| | | |
|---|---|---|
| EP | 0391601 | 10/1990 |
| KR | 10-2003-0057245 | 7/2003 |
| KR | 2003-57245 | 7/2003 |
| KR | 10-0828234 | 1/2007 |
| KR | 0828234 | 5/2008 |

OTHER PUBLICATIONS

Office Action dated Dec. 10, 2008, issued in Korean Patent Application No. 10-2008-0055657, with English translation.

* cited by examiner

AERIAL WIND POWER GENERATING SYSTEM USING FLOATING BODY

TECHNICAL FIELD

The present invention relates, in general, to aerial wind power generating systems which generate electricity using wind power in states in which the systems are floated in midair, for example, by floating force of balloons, and, more particularly, to an aerial wind power generating system, in which a wind passage is formed through a floating body, similar to a balloon, thus generating electric energy using force of wind, passing through the wind passage.

BACKGROUND ART

As well known to those skilled in the art, various kinds of generating systems using wind power have been disclosed. Such wind power generating systems are classified into wind power generating systems, which are installed on the ground, and aerial wind power generating systems, which are floated in midair.

As a representative example of the aerial wind power generating systems, an airship type wind power generating system was proposed in Korean Patent Laid-open Publication No. 10-2006-0114773.

However, the conventional technique of No. 10-2006-0114773 has only a basic structure such that generators having propellers are provided on an airship body. Therefore, there is a disadvantage in that, if weak wind blows, the generating efficiency thereof is markedly reduced.

Furthermore, because the airship body must have a relatively large size to install the several generators thereon, the conventional technique cannot be adapted to an aerial generating system having a small capacity. In addition, in the case of the airship type, because it is difficult to remove the wind power generating system, it cannot be used as a temporary and portable wind power generating system.

In an effort to overcome the above problems experienced with the conventional aerial wind power generating system, the applicant of the present invention provides an aerial wind power generating system having an improved structure such that despite weak wind, satisfactory wind power generation can be ensured, and such that it can be easily manufactured, thus being easily adapted to a wind power generating system capable of obtaining either a small or a large capacity of generating energy, and such that it is easy to remove the system.

DISCLOSURE OF INVENTION

Technical Problem

Accordingly, the present invention has been made keeping in mind the above problems occurring in the prior art, and an object of the present invention is to provide an aerial wind power generating system using a floating body which has an improved structure such that despite weak wind, satisfactory wind power generation can be ensured, and such that it is easy to install and remove the aerial wind power generating system, thus being effectively adapted to a temporary and portable wind power generating system.

Technical Solution

In order to accomplish the above object, in a first embodiment, the present invention provides an aerial wind power generating system floated in midair and connected by support wires to a wire rotating unit, the aerial wind power generating system including: a floating body connected to the support wires, the floating body having a flat shape, with an air injection port provided in the floating body so that air is injected into the floating body through the air injection port, and direction control blades provided on and under a rear end of the floating body, respectively; a wind passage formed through a central portion of the floating body in a horizontal direction and having a longitudinal shape, so that wind passes through the wind passage in the horizontal direction; and a wind power generating unit, comprising a plurality of turbine blade assemblies installed in the wind passage, the turbine blade assemblies being rotated by wind passing through the wind passage, and a plurality of generators to generate electric energy using a rotating force, transmitted from the turbine blade assemblies through turbine shafts.

In a second embodiment, the present invention provides an aerial wind power generating system floated in midair and connected by support wires to a wire rotating unit, the aerial wind power generating system including: a pair of floating bodies connected to the respective support wires, each of the pair of floating bodies having a longitudinal shape, with an air injection port provided in each of the floating bodies so that air is injected into the floating body through the air injection port, and direction control blades provided on and under a rear end of each of the floating bodies, respectively; a wind passage defined between an upper connection member and a lower connection member to have a longitudinal shape in a horizontal direction, the upper connection member and the lower connection member being connected at opposite edges thereof to upper and lower portions of medial parts of the floating bodies, respectively, so that wind passes through the wind passage in the horizontal direction; and a wind power generating unit, comprising a plurality of turbine blade assemblies installed in the wind passage, the turbine blade assemblies being rotated by wind passing through the wind passage, and a plurality of generators to generate an electric energy using a rotating force, transmitted from the turbine blade assemblies through turbine shafts.

In each embodiment, the generators of the wind power generating unit may be provided on opposite sidewalls of an inner surface of the wind passage and at a central portion in the wind passage, wherein each of the turbine blade assemblies may be provided between the adjacent generators.

Each of the turbine blade assemblies may be a hard turbine blade assembly, comprising hard blades provided on a circumferential outer surface of the corresponding turbine shaft at positions spaced apart from each other at regular angular intervals.

Each of the turbine blade assemblies may be a light turbine blade assembly, comprising circular rims fastened to respective opposite ends of the corresponding turbine shaft by support ribs, a plurality of blade support bars connected between the circular rims, the blade support bars being spaced apart from each other at regular intervals, and a soft blade provided between the turbine shaft and each of the blade support bars.

The aerial wind power generating system may further include: a speed increasing means, comprising a large diameter rotary body fitted over the turbine shaft of each of the hard turbine blade assemblies, a small diameter rotary body connected to the large diameter through a power transmission member, and a speed increase gear device coupled to the small diameter rotary body, the speed increase gear device being connected to the corresponding generator, so that a rotating force of the small diameter rotary body is transmitted to the speed increase gear device at a speed, which is primarily increased by a connection between the large diameter rotary body and the small diameter rotary body through the power transmission member, the rotating force of the small diameter rotary body is secondarily increased in speed in the speed increase gear device, and transmitted to the generator.

Each of the large diameter rotary body and the small diameter rotary body may comprise a pulley, and the power transmission member may comprise a belt.

Each of the large diameter rotary body and the small diameter rotary body may comprise a chain gear, and the power transmission member may comprise a chain.

The floating body may be made of PVC (polyvinyl chloride) material.

The floating body may be made of urethane material.

In the first embodiment, a hard support member may be attached to an inner surface of the wind passage, the hard support member being made of hard resin, and the wind power generating unit may be installed on the hard support member.

In the second embodiment, each of the upper connection member and the lower connection member may be manufactured by covering an entire outer surface of a hard substance with an outer shell, which is made of the same material as the floating bodies, and by adhering the outer shell to the outer surface of the hard substance, and the outer shell may be adhered to the floating bodies by high-frequency adhesion.

ADVANTAGEOUS EFFECTS

The present invention provides an aerial wind power generating system using a floating body, which delimits therein a wind passage, in which a wind power generating device is installed. The aerial wind power generating system of the present invention can reliably conduct its wind power generating performance under weak wind conditions as well as strong wind conditions.

Furthermore, the present invention can provide an aerial wind power generating system having the ability to generate a relatively small electric capacity. Therefore, the installation or removal of the aerial wind power generating system can be easily performed. Thus, the present invention can be very effectively adapted to a temporary and portable wind power generating system.

BEST MODE FOR CARRYING OUT THE INVENTION

Hereinafter, preferred embodiments of the present invention will be described in detail with reference to the attached drawings.

First Embodiment

Figure 1:
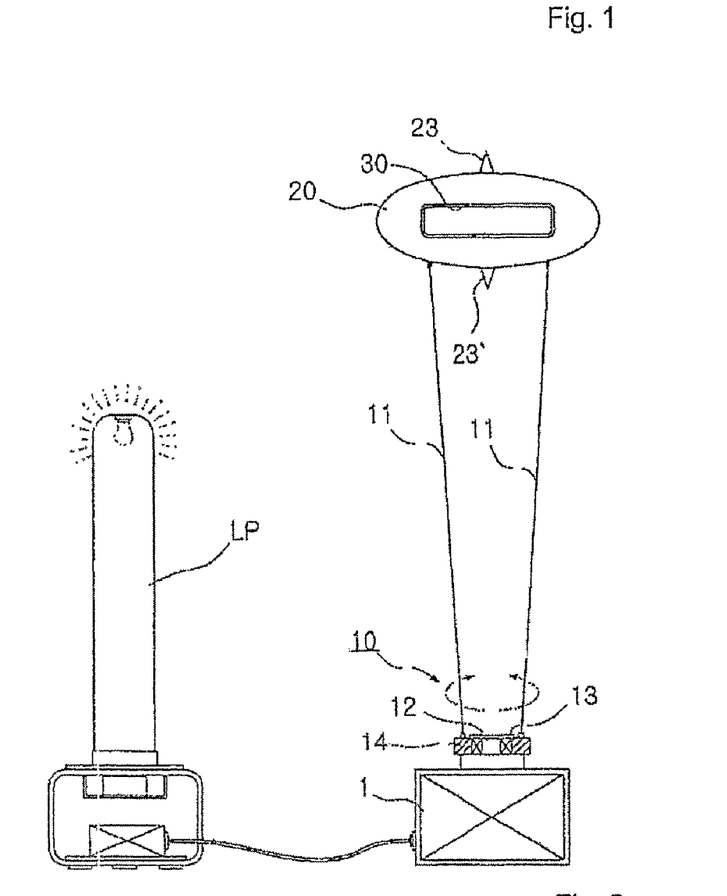
FIG. 1 is a view illustrating an example of the use of an aerial wind power generating system according to the present invention.

FIG. 1 is a view illustrating an example of the use of an aerial wind power generating system according to the present invention. As shown in FIG. 1, for example, in the case of an outdoor lighting apparatus LP, which was developed by the applicant of the present invention, because it is mainly used outdoors, for example, in a deserted place, for lighting in an emergency, it is difficult to supply power to the outdoor lighting apparatus LP.

In this case, the present invention can be used to supply electric power to the outdoor lighting apparatus LP. In detail, a floating body is floated in air and generates electricity using wind, thus supplying power to the outdoor lighting apparatus LP, thereby enabling outdoor work even in an emergency.

Furthermore, for convenience of the use of the present invention, it is necessary to make installation or removal of the present invention easy, and the floating body must be able to rotate such that it is oriented towards the direction from which wind blows.

FIG. 1 illustrates the use of the aerial wind power generating system according to a first embodiment of the present invention, in which a wire rotating unit 10 is provided on a battery charger 1.

The wire rotating unit 10 serves to rotate the floating body 20 of the first embodiment such that the floating body 20 is oriented towards the direction from which wind blows.

In the wire rotating unit 10, a rotary body 14 is provided around the center shaft 12 so as to be rotatable around the center shaft 12 using a bearing 13 interposed therebetween. The floating body 20 is coupled to the rotary body 14 through support wires 11.

Therefore, when a head wind strikes direction control blades 23 and 23', the floating body 20 is slowly rotated in midair such that a wind passage 30 of the floating body 20 is oriented in the direction in which wind blows, and, simultaneously, the support wires 11 are also rotated around the center shaft 12.

Figure 2:
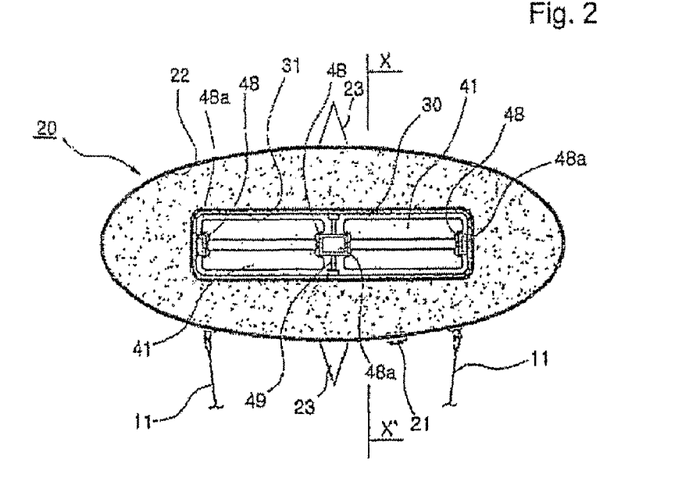
FIG. 2 is a front sectional view showing the construction of an aerial wind power generating system, according to a first embodiment of the present invention.
Figure 3:
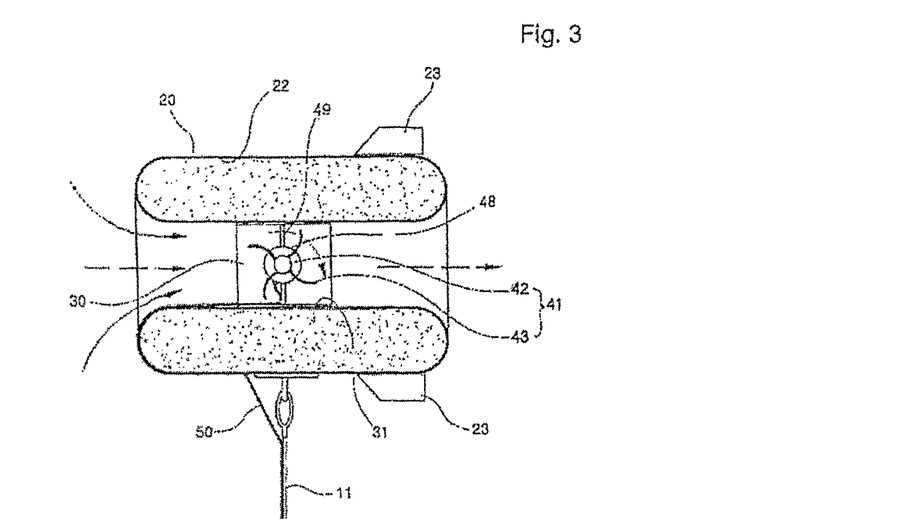
FIG. 3 is a sectional view taken along the line X-X' of FIG. 2.

As such, referring to FIGS. 2 and 3, the floating body 20 is afloat in midair, and connected to the wire rotating unit 10 by the support wires 11.

In detail, the floating body 20 has a relatively flat shape and defines therein an internal space 22, into which air is injected through an air injection port 21. The floating body 20 is made of PVC (polyvinyl chloride) or urethane.

The air injection port 21 used in the present invention has the same structure as the air injection port, which was disclosed in Korean Utility Model Registration No. 0349396, which was filed by the inventor of the present invention, therefore further explanation and illustration are deemed unnecessary.

Meanwhile, the direction control blade 23 and 23' are respectively provided on and under the rear end of the floating body 20.

The wind passage 30 is defined in the central portion of the floating body 20 and extends in the horizontal direction, so that wind horizontally passes through the wind passage 30.

Furthermore, a wind power generating unit 40 is installed in the wind passage 30 to generate electric energy using wind which blows in midair. To firmly support the wind power generating unit 40 in the wind passage 30, a hard support member 31, which is made of hard resin, is attached to the inner surface of the wind passage 30, and the wind power generating unit 40 is installed in the hard support member 31.

The hard support member 31 serves as a reinforcing plate and is preferably made of fiber glass or carbon fiber, which is relatively light and hard. The hard support member 31 is adhered to the floating body 20 by a PVC adhesive or the like.

The wind power generating unit 40 includes a plurality of turbine blade assemblies, which are rotated by wind that passes through the wind passage 30. One kind of turbine blade assemblies selected from between hard turbine blade assemblies 41 and light turbine blade assemblies 41' are used as the turbine blade assemblies of the wind power generating unit 40.

The wind power generating unit 40 further includes a plurality of generators 48, which generate electric energy using rotating force transmitted from the turbine blade assemblies.

As shown in FIG. 2, the generators 48 are provided on the opposite sidewalls of the wind passage 30 and at the central portion in the wind passage 30, respectively. Furthermore, a turbine blade assembly 41 is provided between adjacent generators 48. In the drawings, the reference numeral 48a denotes a rotor, and 49 denotes a support rod.

The generators 48 generate electric energy using the rotation of the rotors 48a. When the rotors 48a rotate in one direction, electricity is generated. Of course, even when the rotors 48a, which have rotated in one direction, rotate in the reverse direction, electricity can be generated. In other words, although the turbines blades 41, which have rotated in one direction, abruptly rotate in the reverse direction, the generators 48 can generate electricity. Such generators are generating devices, which are well known to those in this art, therefore further explanation will be skipped.

Accordingly, in the case of the hard turbine blade assemblies 41 of FIG. 2, when the hard turbine blade assemblies 41 are rotated, the rotators 48a, which are coupled to a turbine shaft 42, are rotated. Thereby, the generators 48 generate electric energy. As shown in FIG. 3, electric energy, which is generated through this process, is applied to the battery charger 1 through an electric wire 50, which extends to the battery charger 1 along the support wire 11, thus charging the battery charger 1 with electricity.

As shown in FIGS. 2 and 3, each hard turbine blade assembly 41 used in the present invention is configured such that hard blades 43 are provided on the circumferential outer surface of the corresponding turbine shaft 42 at positions spaced apart from each other at regular angular intervals.

Figure 4:
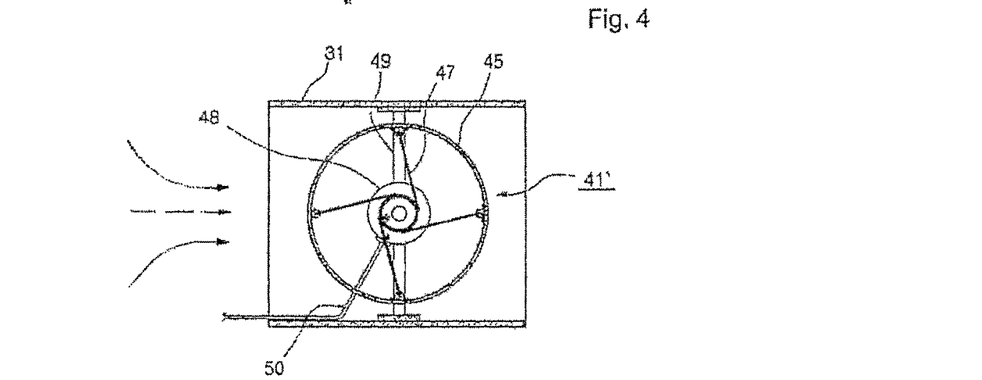
FIG. 4 is a sectional view of a light turbine blade assembly used in the aerial wind power generating system of the present invention.
Figure 5:
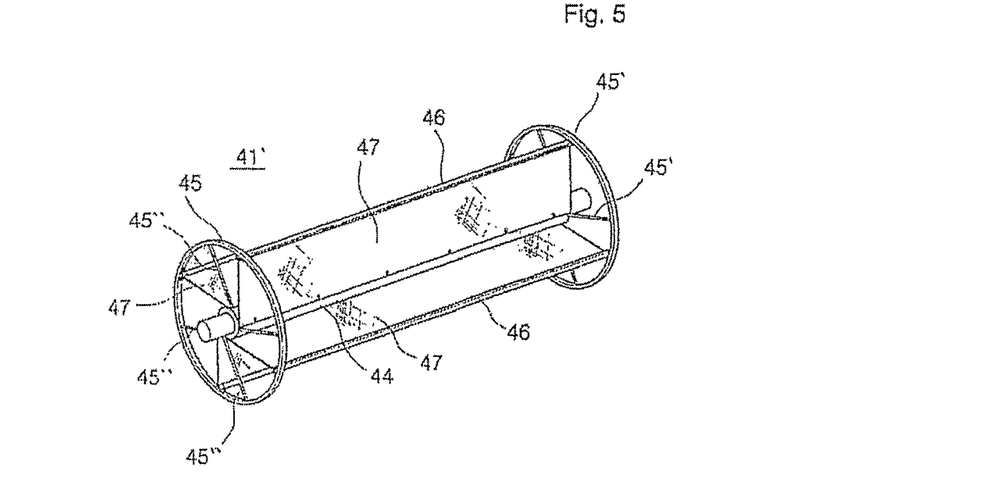
FIG. 5 is a perspective view of the light turbine blade assembly of the aerial wind power generating system according to the present invention.
Figure 6:
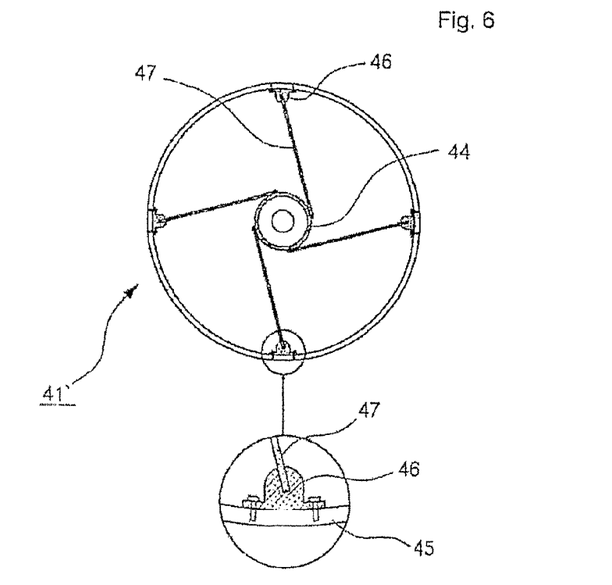
FIG. 6 is a cross sectional view of the light turbine blade assembly of FIG. 5.

In the case of the light turbine blade assembly 41', as shown in FIGS. 4 through 6, circular rims 45 and 45' are fastened to respective opposite ends of a turbine shaft 44 using support ribs 45". A plurality of blade support bars 46, which are spaced apart from each other at regular intervals, are connected between the circular rims 45 and 45'. A soft blade 47 is provided between the turbine shaft 44 and each blade support bar 46.

In the light turbine blade assembly 41', the term "soft blade 47" means a blade, which is made of material other than metal, which is relatively heavy. For example, the soft blade 47 is made of PVC or urethane material, which has a predetermined flexibility and is lighter than metal. The use of such soft blades 47 is to reduce the weight thereof as much as possible.

Meanwhile, the present invention is provided with the direction control blade 23 and 23'. Thus, the floating body 20 is rotated in midair such that it can always be oriented towards the direction, in which wind blows, so that wind passes through the wind passage 30.

Here, because the wind passage 30 is relatively narrow, when wind, which has been in open space, enters the wind passage 30, wind is rapidly drawn into the wind passage 30 by a principle in which when fluid flows from a wide space to a narrow space, the velocity thereof is increased. Therefore, although wind blows outside the wind passage 30 at a relatively low wind velocity, when wind enters the wind passage 30, the wind velocity is automatically increased.

Furthermore, because wind which passes through the wind passage 30 is not directly affected by wind which blows outside the floating body 20, wind can linearly pass through the wind passage 30 without being scattered. Therefore, the wind velocity can be further increased.

As such, although the wind is blowing softly outside, because the wind velocity is increased when wind passes through the wind passage 30, the turbine blade assembly, that is, the hard turbine blade assembly 41 or the light turbine blade assemble 41', can be rotated at a sufficient speed such that the generators 48 can satisfactorily generate electricity. Therefore, in the present invention, even when wind blows softly as well as when wind blows hard, the function of generating electricity using wind power can be satisfactorily conducted.

Furthermore, in the present invention, because the floating body 20 has a simple structure which is flat, when the floating body 20 is manufactured, the size thereof can be easily changed. In addition, the size of the wind passage 30, the number of turbine blade assemblies and the number of generators 48 can be easily changed. Hence, as well as an aerial wind power generating system having a relatively large capacity, an aerial wind power generating system having a relatively small capacity can be easily manufactured.

Particularly, in the case of the aerial wind power generating system having a relatively small size and capacity, installation or removal thereof is facilitated. Therefore, the present invention can be effectively used as a temporary and portable wind power generating system.

Second Embodiment

FIGS. 7 through 11 illustrate a second embodiment of the present invention.

In the description of an aerial wind power generating system according to the second embodiment of the present invention, with regard to the same constructions as the first embodiment, the detailed explanation thereof or an explanation of the illustrations in the drawings will be skipped. The construction and operation, which pertain to only the second embodiment, will be described.

Figure 7:
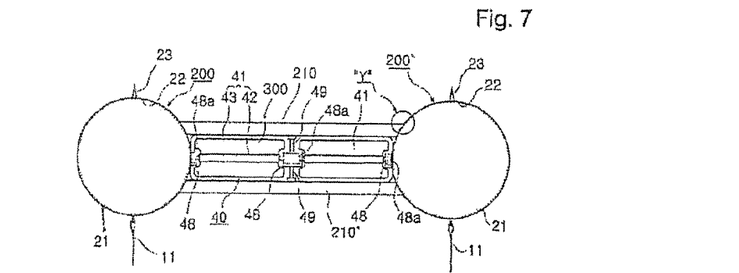
FIG. 7 is a front view showing the construction of an aerial wind power generating system, according to a second embodiment of the present invention.
Figure 8:
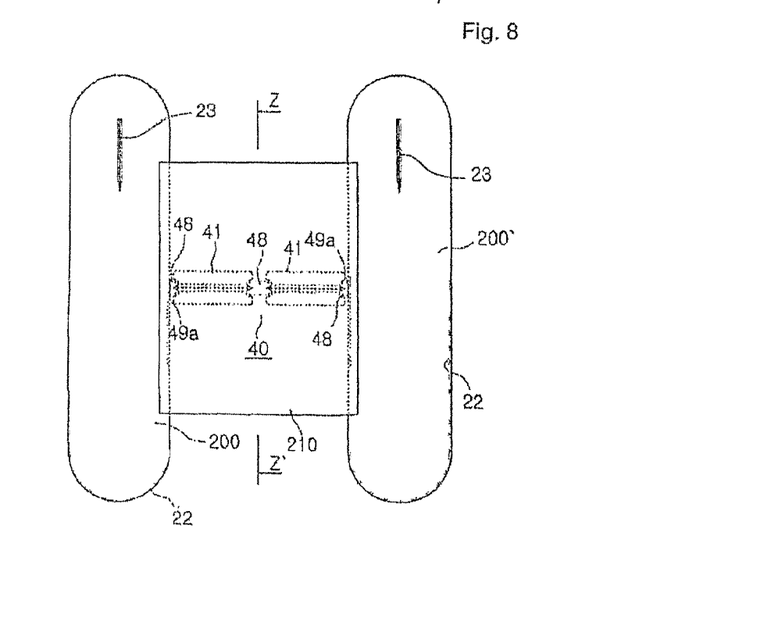
FIG. 8 is a plan view showing the aerial wind power generating system according to the second embodiment of the present invention.

Referring to FIGS. 7 and 8, the aerial wind power generating system according to the second embodiment of the present invention includes a pair of floating bodies 200 and 200', which float in air and are restrained in midair by respective support wires 11, which are coupled to a wire rotating unit 10.

The floating bodies 200 and 200' are coupled to the respective support wires 11. Each floating body 200, 200' has a longitudinal shape and is constructed such that air is injected into an internal space 22 thereof through an air injection port 21, which is provided in the surface of the floating body 200, 200'.

Furthermore, each floating body 200, 200' is made of PVC or urethane material. Direction control blade 23 and 23' are respectively provided on and under the rear end of each floating body 200, 200'.

An upper connection member 210 and a lower connection member 210' are connected at opposite edges thereof to the medial portions of the floating bodies 200 and 200', such that a wind passage 300, which extends in the horizontal direction to have a longitudinal shape, and through which wind passes in the horizontal direction, is defined between the upper connection member 210 and the lower connection member 210'.

A wind power generating unit 40 is provided in the wind passage 300. The wind power generating unit 40 includes a plurality of turbine blade assemblies, which are rotated by wind passing through the wind passage 300 and are one kind of turbine blade assemblies selected from between hard turbine blade assemblies 41 and light turbine blade assemblies 41', and a plurality of generators 48, which generate electric energy using rotating force transmitted from the turbine blade assemblies.

Figure 10:
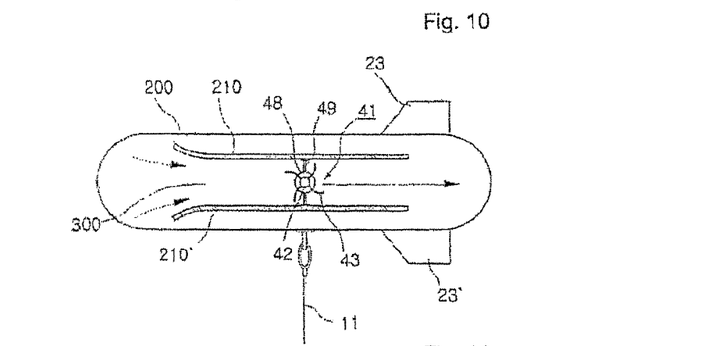
FIG. 10 is a sectional view taken along the line Z-Z' of FIG. 8.
Figure 11:
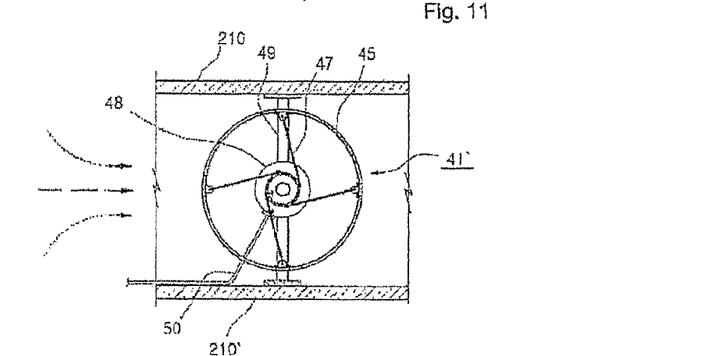
FIG. 11 is a partial enlarged view of a light turbine blade assembly used in the aerial wind power generating system according to the second embodiment of the present invention.

In detail, the generators 48 of the wind power generating unit are provided on the opposite sidewalls of the wind passage 30 and at the central portion in the wind passage 30, respectively. Each turbine blade assembly is provided between adjacent generators 48. In the drawings, the reference numeral 49a denotes a reinforcing member.

Figure 9:
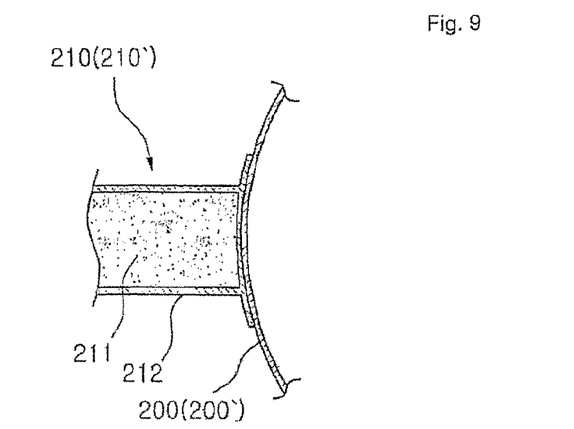
FIG. 9 is an enlarged sectional view of a circled portion "Y" of FIG. 7.

As shown in FIG. 9, each of the upper connection member 210 and the lower connection member 210' is manufactured by covering an entire outer surface of a hard substance 211 with an outer shell 212, which is made of the same material as that of the floating body 200, 200', and by adhering the outer shell 212 to the outer surface of the hard substance 211 using a PVC adhesive. The outer shell 212 is adhered to the floating bodies 200 and 200' by high-frequency adhesion.

Referring to FIGS. 2 and 3, each hard turbine blade assembly 41 is configured such that hard blades 43 are provided on a circumferential outer surface of a turbine shaft 42 at positions spaced apart from each other at regular angular intervals. In the case of the light turbine blade assembly 41', circular rims 45 and 45' are fastened to respective opposite ends of a turbine shaft 44 using support ribs 45". A plurality of blade support bars 46, which are spaced apart from each other at regular intervals, are connected between the circular rims 45 and 45'. A soft blade 47 is provided between the turbine shaft 44 and each blade support bar 46. As such, the hard turbine blade assembly 41 and the light turbine blade assembly 41' have the same constructions as those of the first embodiment.

In the aerial wind power generating system according to the second embodiment, due to the above-mentioned construction, the wind power generating unit 40, which is installed in the wind passage 300 defined between the upper and lower connection members 210 and 210', can be maintained in the floating state by the floating bodies 200 and 200', which are coupled to the opposite ends of the upper and lower connection members 210 and 210'.

Furthermore, because the direction control blade 23 and 23' are provided on each floating body 200, 200', the floating bodies 200 and 200' are rotated in midair such that they can always be oriented towards the direction in which wind blows, so that wind smoothly passes through the wind passage 300.

Here, because the wind passage 300 is relatively narrow, when wind, which has been in open space, enters the wind passage 300, wind is rapidly drawn into the wind passage 300 by a principle in which when fluid flows from a wide space to a narrow space, the velocity thereof is increased. Therefore, although wind blows outside the wind passage 300 at a relatively low wind velocity, when wind enters the wind passage 300, the wind velocity is automatically increased.

Furthermore, because wind, which passes through the wind passage 300, is not directly affected by wind, which blows outside the floating bodies 200 and 200', wind can linearly pass through the wind passage 300 without wind being scattered. Therefore, the wind velocity can be further increased.

As such, although outside wind blows softly, because the wind velocity is increased when wind passes through the wind passage 300, the turbine blade assembly, that is, the hard turbine blade assembly 41 or the light turbine blade assemble 41', can be rotated at a sufficient speed such that the generators 48 can satisfactorily generate electricity. Therefore, in the present invention, even when wind blows softly as well as when wind blows hard, the function of generating electricity using wind power can be satisfactorily conducted.

Furthermore, in the present invention, because the floating bodies 200 and 200' have simple structures, when the floating bodies 200 and 200' are manufactured, the sizes thereof can be easily changed. In addition, the size of the wind passage 300, the number of turbine blade assemblies and the number of generators 48 can be easily changed. Hence, as well as an aerial wind power generating system having a relatively large capacity, an aerial wind power generating system having a relatively small capacity can be easily manufactured.

Particularly, in the case of the aerial wind power generating system having relatively small size and capacity, installation or removal thereof is facilitated. Therefore, the second embodiment of the present invention can also be effectively used as a temporary and portable wind power generating system.

Figure 12:
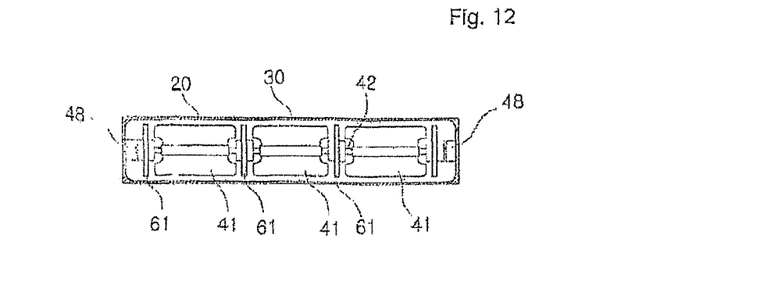
FIG. 12 is a front sectional view showing a speed increase means used in the aerial wind power generating system according to the present invention.
Figure 13:
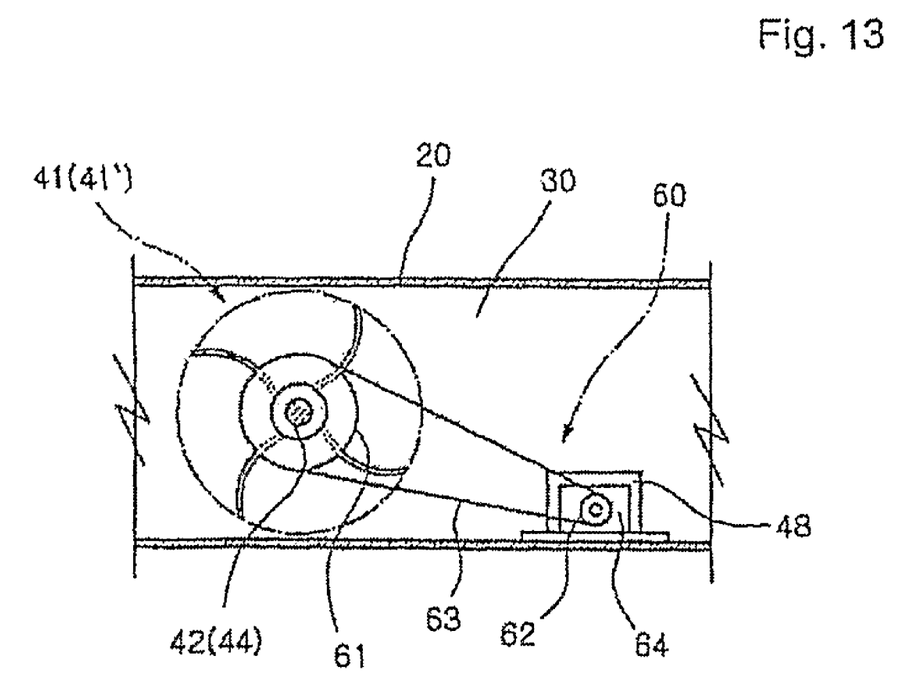
FIG. 13 is a schematic side sectional view showing the speed increase means according to the present invention.

Meanwhile, as shown in FIGS. 12 and 13, the aerial wind power generating system according to the first or second embodiment may be provided with a speed increase means 60 to further increase the electricity generating ability.

In the speed increase means 60, a large diameter rotary body 61, which is fitted over the turbine shaft 42 or 44 of the hard turbine blade assembly 41 or the light turbine blade assembly 41', is connected to a small diameter rotary body 62 by a power transmission member 63 such that they are operated in conjunction with each other, thus primarily increasing the output speed. The rotating force of the small diameter rotary body 62 is transmitted to a speed increase gear device 64 at primarily increased speed, thus secondarily increasing the output speed. The rotating force of the speed increase gear device 64 is transmitted to the generators 48 at a secondarily increased speed, thus further increasing the amount of electricity generated by the generators 48.

For example, pulleys may be used as the large diameter rotary body 61 and the small diameter rotary body 62, and a belt may be used as the power transmission member 63.

Alternatively, chain gears may be used as the connection between the large diameter rotary body 61 and the small diameter rotary body 62. In this case, a chain is used as the power transmission member 63.

The speed increase gear device 64, which is used in the speed increase means 60, has a plurality of gears, which are operated in conjunction with each other to increase the rotating speed. The speed increase gear device 64 is a well known device, which is also called an increasing gear or an increasing gear box, therefore detailed explanation and illustration thereof will be omitted and only its function pertaining to the present invention will be explained.

In the speed increase means 60 having the above-mentioned construction, when the turbine shaft 42, 44 is rotated, the large diameter rotary body 61 is rotated at the same angular speed as that of the turbine shaft 42, 44. When the rotating force of the large diameter rotary body 61 is transmitted to the small diameter rotary body 62 through the power transmission member 63, the rotating speed of the small diameter rotary body 62 is increased. Therefore, the rotating force of the turbine shaft 42, 44 is transmitted to the small diameter rotary body 62 at a primarily increased speed.

In addition, when the rotating force of the small diameter rotary body 62 is transmitted to the speed increase gear device 64, the speed increase gear device 64 increases the output rotating speed, thus realizing the secondary speed increase.

Therefore, the rotating force of the speed increase gear device 64 which is secondarily increased in speed is transmitted to the generators 48. Thereby, the amount of electricity generation of the generators 48 can be increased.

Moreover, although wind blows not strongly in midair and the turbine blade assemblies are thus slowly rotated, the rotating force of the turbine blade assemblies is transmitted to the generator 48 at an increased speed by the speed increase means 60. Thus, the electricity generating operation can be satisfactorily conducted. If wind blows strongly, the electricity generation ability can be further increased.

Although the preferred embodiments of the present invention have been disclosed for illustrative purposes with reference to the attached drawings, those skilled in the art will appreciate that various modifications, additions and substitutions are possible, without departing from the scope and spirit of the invention as disclosed in the accompanying claims. Accordingly, any and all modifications, additions and substitutions which may occur to those skilled in the art should be considered to be within the scope of the invention.

INDUSTRIAL APPLICABILITY

As described above, in an aerial wind power generating system using a floating body according to the present invention, a wind passage, in which a wind power generating device is installed, is formed through the floating body. Therefore, the aerial wind power generating system can reliably conduct its wind power generating performance under light wind conditions as well as strong wind conditions.

Furthermore, the present invention provides an aerial wind power generating system having the electricity generation ability of a relatively small capacity. In this case, it is easy to install or remove the aerial wind power generating system, so that the present invention can be effectively adapted to a temporary and portable wind power generating system.

The invention claimed is:

1. An aerial wind power generating system floated in midair and connected by support wires to a wire rotating unit, the aerial wind power generating system comprising:
    a pair of floating bodies connected to the respective support wires, each of the pair of floating bodies having a longitudinal shape, with an air injection port provided in each of the pair of floating bodies so that air is injected into each of the pair of floating bodies through the air injection port, and direction control blades provided on and under a rear end of each of the pair of floating bodies, respectively;
    a wind passage defined between an upper connection member and a lower connection member to have a longitudinal shape in a horizontal direction, the upper connection member and the lower connection member being connected at opposite edges thereof to upper and lower portions of medial parts of the pair of floating bodies, respectively, so that wind passes through the wind passage in the horizontal direction; and
    a wind power generating unit, comprising a plurality of turbine blade assemblies installed in the wind passage, the turbine blade assemblies being rotated by wind passing through the wind passage, and a plurality of generators to generate an electric energy using a rotating force, transmitted from the turbine blade assemblies through turbine shafts.

2. The aerial wind power generating system according to claim 1 further comprising:
    speed increasing means, comprising a large diameter rotary body fitted over the turbine shaft of each of the hard turbine blade assemblies, a small diameter rotary body connected to the large diameter rotary body through a power transmission member, and a speed increase gear device coupled to the small diameter rotary body, the speed increase gear device being connected to a corresponding generator, so that a rotating force of the small diameter rotary body is transmitted to the speed increase gear device at a speed, which is primarily increased by a connection between the large diameter rotary body and the small diameter rotary body through the power transmission member, and the rotating force of the small diameter rotary body is secondarily increased in speed in the speed increase gear device, and transmitted to the corresponding generator.

* * * * *